US007958493B2

(12) United States Patent
Lindsey et al.

(10) Patent No.: US 7,958,493 B2
(45) Date of Patent: Jun. 7, 2011

(54) TYPE INFERENCE SYSTEM AND METHOD (76) Inventors: Kevin Edward Lindsey, Fort Worth, TX (US); Paul Colton, Hillsborough, CA (US); Robin Sean Debreuil, Miami (CA); Donald Arthur Washburn, Bellevue, WA (US)

( * ) Notice: Subject to any disclaimer, the term of this patent is extended or adjusted under 35 U.S.C. 154(b) by 1067 days.

(21) Appl. No.: 11/655,729

(22) Filed: Jan. 19, 2007

(65) Prior Publication Data
US 2007/0234288 A1 Oct. 4, 2007

Related U.S. Application Data (60) Provisional application No. 60/760,754, filed on Jan. 20, 2006.

(51) Int. Cl.
*G06F 9/44* (2006.01)
(52) U.S. Cl. ......... 717/117; 717/111; 717/112; 717/148
(58) Field of Classification Search .......... 717/100–117, 717/131–153
See application file for complete search history.

(56) References Cited

U.S. PATENT DOCUMENTS

| 4,989,132 | A | | 1/1991 | Mellender et al. | |
|---|---|---|---|---|---|
| 5,361,351 | A | * | 11/1994 | Lenkov et al. | 717/124 |
| 5,448,740 | A | * | 9/1995 | Kiri et al. | 717/155 |
| 5,812,851 | A | * | 9/1998 | Levy et al. | 717/147 |
| 5,821,851 | A | * | 10/1998 | Blackmer | 340/467 |
| 7,086,041 | B2 | * | 8/2006 | Plesko et al. | 717/141 |
| 2002/0099738 | A1 | * | 7/2002 | Grant | 707/513 |
| 2005/0043940 | A1 | | 2/2005 | Elder | |
| 2005/0066319 | A1 | | 3/2005 | DeLine et al. | |
| 2005/0069207 | A1 | | 3/2005 | Zakrzewski et al. | |

OTHER PUBLICATIONS

Gudeman et al., Representing Type Informationin Dynamically Typed Languages; 1993, aquired from http://citeseerx.ist.psu.edu/viewdoc/download?doi=10.1.1.39.4394&rep=rep1&type=pdf, pp. 1-38.*
Shao et al., A type-based compiler for standard ML; ACM, 1995, pp. 116-129.*
Written Opinion of the International Searching Authority for PCT/US07/01697.

* cited by examiner

Primary Examiner — Wei Y Zhen
Assistant Examiner — Satish Rampuria
(74) Attorney, Agent, or Firm — Nelson Mullins Riley & Scarborough, LLP (57) ABSTRACT Systems and methods of representing and extracting type information from typeless and dynamically-typed programming languages are provided. These systems and methods can be immune to source file edits and the order in which those edits are executed. Deriving type information from these languages allows tools to perform operations, for example, refactoring, intellisense, recognition of semantic errors, etc. These systems and methods can be implemented using processes that, implicitly or explicitly, gather type information for the program, and can also accept user input as well.

8 Claims, 10 Drawing Sheets

TYPE INFERENCE SYSTEM AND METHOD

RELATED APPLICATIONS

The present application claims benefit of priority under 35 U.S.C. §119(e) to U.S. provisional application Ser. No. 60/760,754 entitled "Type Inference System and Method" filed on Jan. 20, 2006, which is hereby incorporated by reference in its entirety.

BACKGROUND OF THE INVENTION

In computer science, the phrase datatype, or type, is used to identify a set of values and operations that can be performed on that set of values. Many programming languages support one or more types, whether implicitly or explicitly. These types may act as a statically or dynamically checked constraint on the programs written in a given language. Types are usually associated with values in memory or with objects such as, for example, variables. Because a value is typically nothing more than a group of bits read by a processor, there is not usually any distinction in the hardware, even among memory addresses, instruction code, characters, integers and floating-point numbers. Therefore, types can be used to indicate how a given collection of bits should be treated.

Typically, values are associated with a given type, although a given type may have associated with it one or more subtypes. Other entities, including dependencies, objects, modules, etc. can be associated with a type. Additionally, a given type can be associated with another type. A type system can be implemented for a programming language to define rules by which the typed program's behavior is governed. Type checking can be used to verify conformance with the rules and to enforce constraints dictated by the type. Type checking can be performed during compilation or at runtime.

Thus, programming languages can be dynamically typed or statically typed. With dynamic typing, typing of variables can be performed on the basis of a given execution path. That is, the typing of a variable may be different. Therefore, dynamic typing is typically performed at runtime. Dynamic typing is often associated with languages such as scripting languages as well as with rapid application development environments. Static types, on the other hand, are often used with compiled languages.

Many scripting languages, for example JAVASCRIPT, do not require the developer to specify the type of their variables, fields, and parameters or the return types of their functions. Also, variable types can change throughout the lifetime of a script's execution. As a result, it is very difficult for a tool, such as an IDE (Integrated Development Environment), to assist the developer with contextual information while they are editing source files. These languages are not necessarily "typeless" in that they have no types, but more accurately the types are not static in that their application is not constrained as in a typed environment. Such languages tend to enable simplifying the task of connecting components, because they all look and behave the same and are therefore interchangeable. For example, a variable may be able to hold a string one moment and an integer the next. Because code and data may be interchangeable, a program can write another program and then execute it on the fly. With such dynamically-typed languages, variable types are typically identified at execution.

Additionally, a dynamically-typed language can facilitate component connections. This is because there are no type-based rules governing use of components and values, and all components and values can be uniformly represented. Thus a component or value can be used in multiple situations. For example, a component designed for one purpose by one designer can be used for a completely different purpose that may never have been envisioned by the original designer. Therefore, dynamically-typed programming languages may encourage reuse of components and values and minimize the uses of multiple, potentially incompatible interfaces. Because in a typed system, a given interface requires objects of specific types the compiler will prevent other types of objects from being used with the interface. With a dynamically-typed system, a new object can utilize an existing interface without the need for conversion code to be written to translate between the types. This can save recompiling part or all of the application.

Further features and advantages of the present invention, as well as the structure and operation of various embodiments of the present invention, are described in detail below.

BRIEF SUMMARY OF THE INVENTION

The present invention is directed toward systems and methods for providing type information from programming languages, including dynamically-typed languages. More particularly, in one embodiment, types and type information can be discovered through various methodologies, examples of which are disclosed below. In one embodiment, the type information can be extracted or inferred while at the same time being immune to source file edits and the order in which those edits may have been executed.

One embodiment provides systems and methods of representing and extracting type information from typeless and dynamically-typed programming languages, such as for example JAVASCRIPT, while at the same time being immune to source file edits and the order in which those edits are executed. Deriving type information from these languages allows tools like an IDE to perform operations that are currently not possible, for example, refactoring, intellisense, recognition of semantic errors, etc. This can be implemented to make a developer's editing experience approach the richness of the experience expected in typed languages. This embodiment can be implemented using processes that, implicitly or explicitly, gather type information for the program, and can also accept user input as well. Although type information can be computer inferred or user supplied, it is contemplated that most applications will rely more heavily on computer-generated type information.

One feature of the present invention is to provide a system and method for extracting type information. In one embodiment, a system may generate nodes associated with symbols. The system may then request type information based on a particular symbol and, in response to the request, return a value associated with the particular symbol.

Another feature of the present invention is to provide a system for populating a type environment. In one embodiment, the system processes inputs obtained from one or more sources into type information. The system may then populate a type environment with the type information and thereafter perform one or more queries on the type information.

BRIEF DESCRIPTION OF THE DRAWINGS

The present invention will be described with reference to the accompanying drawings. In the drawings, like reference numbers indicate identical or functionally similar elements. Additionally, the left-most digit(s) of a reference number identifies the drawing in which the reference number first appears.

MODES OF CARRYING OUT THE INVENTION

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting the breadth, scope, or applicability of the invention. It should be noted that for clarity and ease of illustration these drawings are not necessarily made to scale.

The present invention is directed toward systems and methods for providing type information from programming languages, including dynamically-typed languages. More particularly, in one embodiment, types and type information can be discovered through various methodologies, examples of which are disclosed below. In one embodiment, the type information can be extracted or inferred while at the same time being immune to source file edits and the order in which those edits may have been executed.

Before describing the invention in further detail, it is useful to describe an example environment in which the invention can be implemented. One such example is that of a scripting language. From time-to-time, the present invention is described herein in terms of this example environment. Description in terms of this environment is provided to allow the various features and embodiments of the invention to be portrayed in the context of an exemplary application. After reading this description, it will become apparent to one of ordinary skill in the art how the invention can be implemented in different and alternative environments, including with other languages of the dynamically-typed form.

Scripting languages are programming languages designed for scripting the operation of a computer. In other words, they can be used to create a computer program that automates the tasks that a user might otherwise perform manually, for example at the keyboard or other user interface. A shell script can be included to provide commands that might be typed by the user, for example at a command prompt. A user can, for example, write a script that would combine a sequence of editing tasks that the user expects to perform repeatedly during programming operations. In one respect, scripting languages can be thought of as facilitating the connection of diverse pre-existing components to perform new functions.

JAVASCRIPT, is an example of a scripting language that is based on the concept of prototypes. It is commonly used with website development, but can also be used to enable scripting access to objects embedded in other applications. JAVASCRIPT syntax is loosely based on the C programming language. It has no input or output constructs of its own, and a JAVASCRIPT engine relies on a host program into which it is embedded. JAVASCRIPT variables can also be referred to as being dynamically typed, in that they are not constrained by variable types upon creation. Unlike C, for example, where variables must be defined up front as int, char, etc., JAVASCRIPT variables can be defined by either just assigning them a value, or by using the var statement. The variables can be declared outside of any function, and if declared without the var statement, are in global scope, visible in the entire web page. Otherwise, variables declared inside a function with the var statement are local to that function. JAVASCRIPT variables can pass from one page to another using cookies, a hidden frame or windows and the like.

Having thus described an example environment in which the invention can be implemented, various features and embodiments of the invention are now described in further detail. Description may be provided in terms of this example environment for ease of discussion and understanding. After reading the description herein, it will become apparent to one of ordinary skill in the art that the present invention can be implemented in any of a number of different software environments, including with other dynamically-typed software languages. It will also become apparent to one of ordinary skill in the art that various features and methodologies described herein can be applied to statically typed languages.

In one embodiment, the invention provides systems and methods of representing and extracting type information from typeless and dynamically-typed programming languages, such as for example JavaScript, while at the same time being immune to source file edits and the order in which those edits are executed. Deriving type information from these languages allows tools like an IDE to perform operations that are currently not possible, for example, refactoring, intellisense, recognition of semantic errors, etc. This can be implemented to make a developer's editing experience approach the richness of the experience expected in typed languages. This invention can be implemented using processes that, implicitly or explicitly, gather type information for the program, and can also accept user input as well.

Although type information can be computer inferred or user supplied, it is contemplated that most applications will rely more heavily on computer-generated type information.

Figure 1:
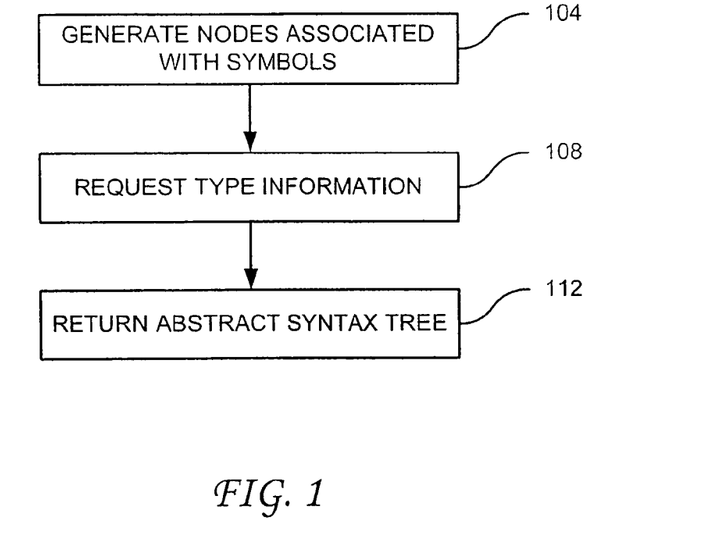
FIG. 1 is an operational flow diagram illustrating an example process for extracting type information in accordance with one embodiment of the invention.

FIG. 1 is an operational flow diagram illustrating an example process for extracting type information in accordance with one embodiment of the invention. Referring now to FIG. 1, in a step 104, a parser is used to generate Abstract Syntax Tree (AST) nodes that are associated with symbols in a runtime environment. An Abstract Syntax Tree is typically a tree structure that captures the semantics of source code statements. The parsing and symbol association can be implemented to occur as files are included in a project and as the developer modifies the code.

In a step 108, type information is requested by an outside process such as an IDE. This step can be performed at a later point in time such as, for example, during editing. In one embodiment, a position and a symbol can be used as keys to query the runtime environment. For example, the symbol can be used to retrieve information about the underlying object being queried. The position information can be useful as, in the example environment, variable types can change throughout the lifetime of a script's execution. Therefore, the symbol may have different type information at different positions in the source.

In a step 112, once the symbol is located in the environment, the abstract syntax tree or other value associated with the symbol is returned. The abstract syntax tree is evaluated based on the current state of the environment and returns the type at that moment in time for the given file and file offset. In some implementations, functions can have multiple signatures and as a result, multiple return types. Therefore, in one embodiment, the inferencing engine can be implemented to provide techniques for capturing this dynamic information. For example, in one embodiment nodes can be created in the abstract syntax tree for each occurrence of a symbol, and information stored for each such occurrence. In this embodiment, the specific information for a given occurrence can be used to infer a type for that occurrence of the symbol.

In one embodiment, associated abstract syntax trees and symbols may be removed from the runtime environment during editing. However, all references to symbols can still be counted. As a result, where all references are counted, the process can be implemented such that a symbol will be removed from the environment only when the last reference to that symbol is removed from the source code. It should be noted that in one embodiment, symbol table associations do not have to depend on the order of these edits.

Figure 2:
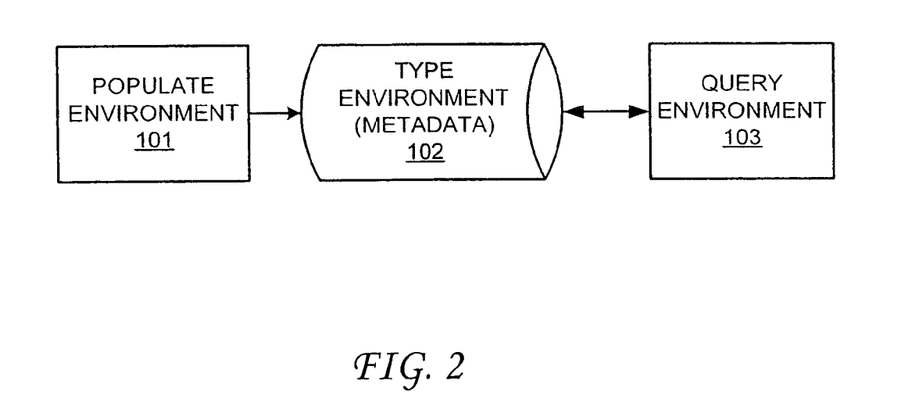
FIG. 2 is a diagram illustrating an exemplary general process of populating a type environment with metadata and querying that metadata in accordance with one embodiment of the invention.

FIG. 2 is a diagram illustrating an exemplary general process of populating a type environment with metadata and querying that metadata in accordance with one embodiment of the invention. Item 101 processes a set of inputs that can be obtained from various sources and uses the processed information to populate a type environment 102. The type environment can be combined with, for example, other information in a runtime environment. The inputs can contain structured data that can be converted into type information and stored as metadata or other data within the type environment. In one embodiment, the type environment 102 is implemented using a hash table that contains information pertaining to the variable. For example, hash table entries may include information such as a reference count indicating the number of times a variable is referenced and the one or more values or types that the referenced variable may take on at a given point in the source. As this example illustrates, other data structures can be used to create type environment 102. Populating environment 102 in advance and providing the ability to store multiple values for a given variable allows values to be properly determined for a given point in the source or for a given region of the source. After item 102 has been populated, item 103 can begin making queries on the type information contained in item 102 to extract the value. Examples of these steps are described in more detail below.

Figure 3:
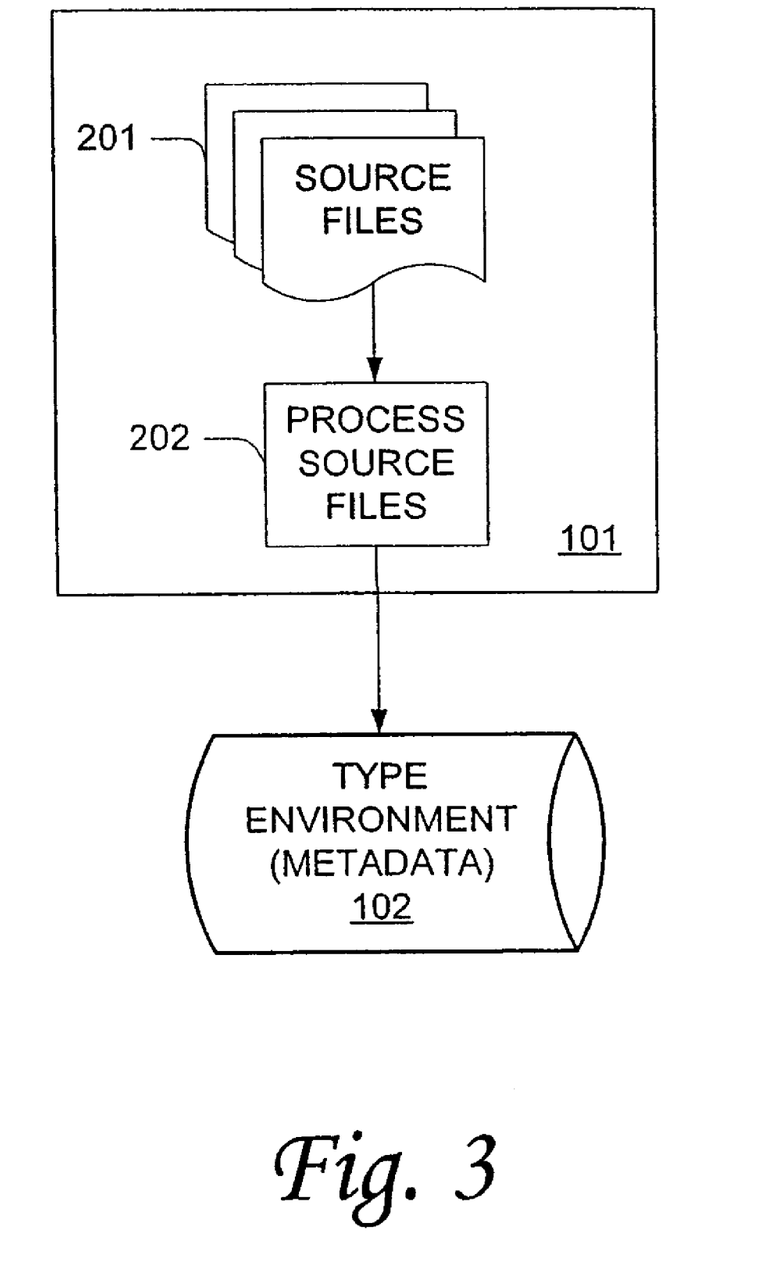
FIG. 3 is a diagram illustrating an example of one type of input that can be used to populate the type environment in accordance with one embodiment of the invention.

FIG. 3 is a diagram illustrating an example of one type of input that can be used to populate the type environment in accordance with one embodiment of the invention. In this example, one or more source files 201 are used to feed the process that populates item 102. In one embodiment, source files 201 can be a Unicode or ASCII text file whose contents follow a structured format as defined by an associated BNF grammar (defined below), although other source files 201 can be used. A Unicode file can follow a binary format used to encode text such as that defined by Unicode, Inc, at www.unicode.org. These source files 201 can, for example, be comprised of JAVASCRIPT source code, XML, programming language comments or other source files 201 such as those used with the environment in which the invention may be implemented.

In this example, the source files 201 are processed at step 202, which step analyzes the source code 201 to extract type information for the symbols defined in the source files. In other words, process 202 can be used to extract the type information from one or more source files 201, and the extracted information can be sent to the type environment 102 for storage. In one embodiment, state information is created as the source files are executed. Alternatively, such information can be extracted or created without execution such as for example through parsing. In one embodiment, the extracted data is added to or merged with the data or other information that may already exist in a type environment 102. As such, this process need not be a single-pass process in this embodiment.

Figure 4:
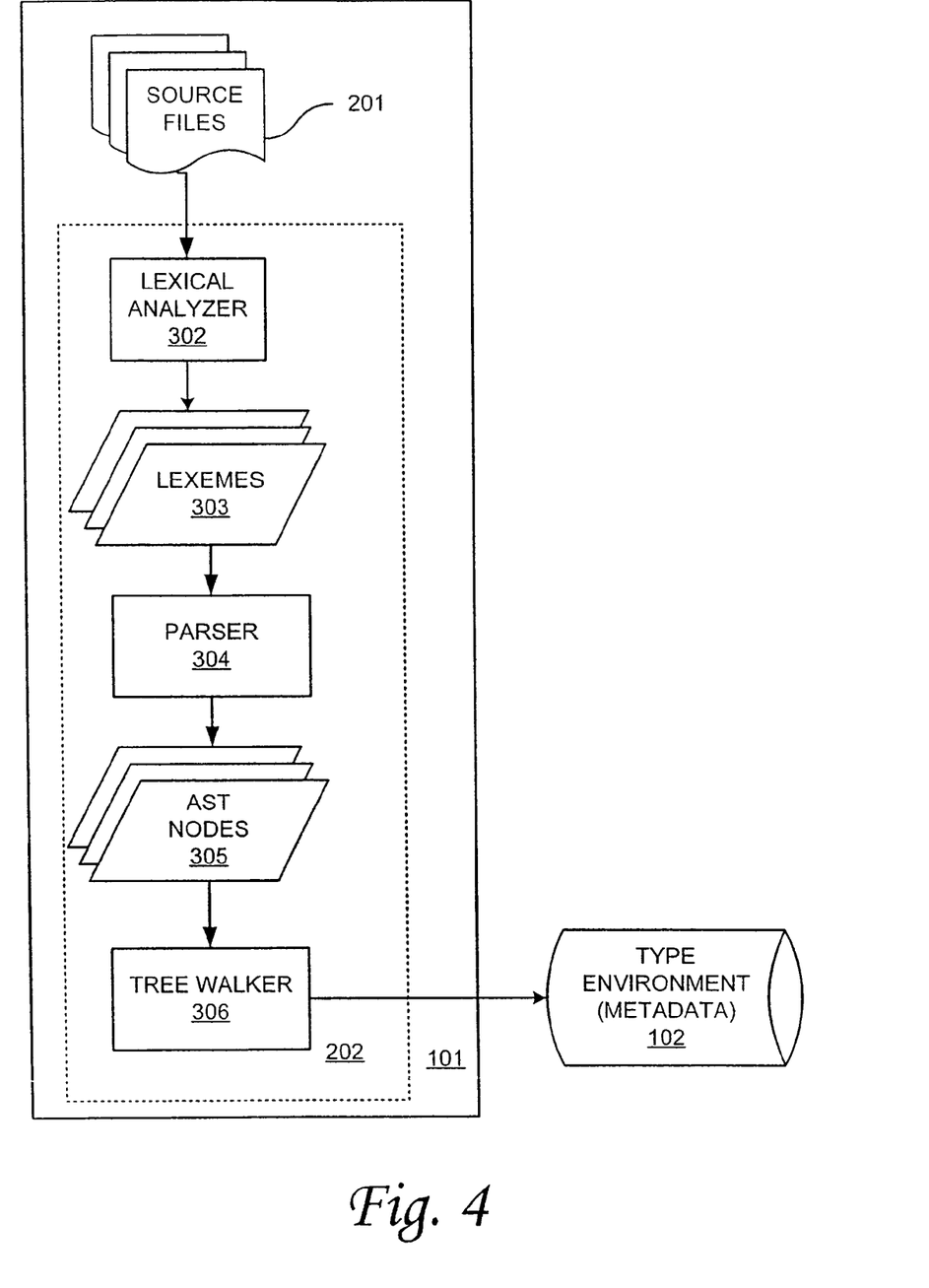
FIG. 4 is a diagram illustrating an exemplary implementation for a process for the conversion of source files for the population of environment information in accordance with one embodiment of the invention.

FIG. 4 is a diagram illustrating an exemplary implementation for a process 202 for the conversion of source files for the population of environment information 102 in accordance with one embodiment of the invention. Referring now to FIG. 4, in a step 302 individual words or tokens of the programming language in which a source file 201 is written are identified. This step can be implemented using a lexical analyzer, or lexer. A lexer can be implemented to scan a stream of text and find patterns of text or characters or other symbols in source files 201. These patterns are called tokens and specific instances of these tokens are called lexemes. The output of step 302 in one embodiment, then, is a collection of lexemes. The process can be implemented such that one lexeme is created for each token type that is recognized. A lexeme can be, for example, a unit of analysis of the source 201 and can have associated therewith a particular meaning or value. In one implementation, the lexeme is a minimal or fundamental unit of the lexicon of the source code. Such a lexical analysis can, for example, convert strings in the source code into a list of lexemes, which can then be passed to a parser for syntactic analysis.

In a step 304, a parser or other like methodology is used to analyze the stream of lexemes. A parser can be implemented to scan a stream of tokens and detect patterns in the tokens. The token patterns are typically described by a Backus Naur Form grammar, or BNF (sometimes referred to as the Backus Normal Form). In effect, in this implementation, a parser recognizes the pattern of tokens as described by the Backus Naur Form grammar. The Backus Naur Form, is a formal mathematical way to describe a language that can be used to define the structure of grammars usually referred to as context-free grammars. It is a metasyntax that can express context-free grammars and is often used as a notation for programming languages and command sets. Variants of the Backus Naur Form, such as, for example, the extended Backus Naur Form, can be employed to represent equivalent grammars, sometimes more concisely than the Backus Naur Form. Because language standards often use some variant of Backus Naur Form or extended Backus Naur Form to define the grammar of the language, the parser for the compiler can be generated automatically in one embodiment. However, it is useful that the grammar used for source files 201 be computer recognizable such as, for example, context-free grammars.

As a result of this step 304, the parser can generate a tree structure that captures the semantics for source files 201 for those files or for regions of source code. In one embodiment, this is accomplished while the parser is processing a syntactically correct source file region. A result of step 304 can be a collection of trees 305, which, in one embodiment comprises one tree 305 (or subtree) for each valid language statement. As stated above, the trees 305 can be implemented as abstract syntax trees, or other data structure representing the parsed information. In one embodiment, files that are only partially constructed and files that contain partial errors can still be parsed and a tree or other data structure generated to identify the values obtained for the lexemes or other data elements. Where source is not parsable or where errors are identified, an output of the parser may be an error token or other symbol that is stored in the abstract syntax tree.

In another embodiment, where a variable is encountered that is invalid or otherwise not typically parsable, the parser may make a guess based on available information, past usage or other data. For example, assume the parser encounters the partially completed snippet "a._" in which the remainder of the string is not filled in. The parser can infer a value for the snippet based on historical usage. For example, the parser may infer that the missing element is "b" and the snippet should be "a.b" based on past usage. Additionally, the invention may also create a value for "a" as well. For example, if the text "a.b=10" is found in the source file 201, but there is no other reference to "a" in the source, an entry for "a" can be created in the type environment. Then, when "a" is subsequently entered by a user, the system can display "b" as a possible completion of that statement based on the prior encounter of "a.b" in the source file 201. In one embodiment, such 'guesses' are stored so as to be identifiable as an estimate or guess, rather than as a final result. For example, a list of error tokens can be stored such as in a node as a list or array. The user can be provided with a pop-up or other message telling him or her that the error was encountered so that appropriate action can be taken. Additionally, the user may be given the opportunity to change the 'guess' made by the parser.

In a step 306 the tree structures 305 are traversed to associate sub-trees with symbols in the type environment 102. This can be done, for example, using a tree walker or other like technology. In this embodiment, the system visits the nodes in the tree and evaluates their contents. For a given node, the walker determines an appropriate symbol, value or type to associate with the node and creates an entry for the type environment 102 (for example, one embodiment creates a hash table entry for a snippet). An example process for walking the tree is illustrated in more detail below with reference to FIG. 7. As this example illustrates, other data structures can be similarly analyzed to extract the type information.

As stated above, other data structures and typing methodologies can be used in addition to or in place of tree structures. In one embodiment, for example, values can be directly associated with a symbol. For example, if the parser encounters the text "x=5" in a source file 201, the parser can associate the "Number" type with the "x" symbol directly. This can be an optimization step and can obviate the need to populate and later walk a tree structure where the value is known, or when the symbol always returns the same type.

Figure 5:
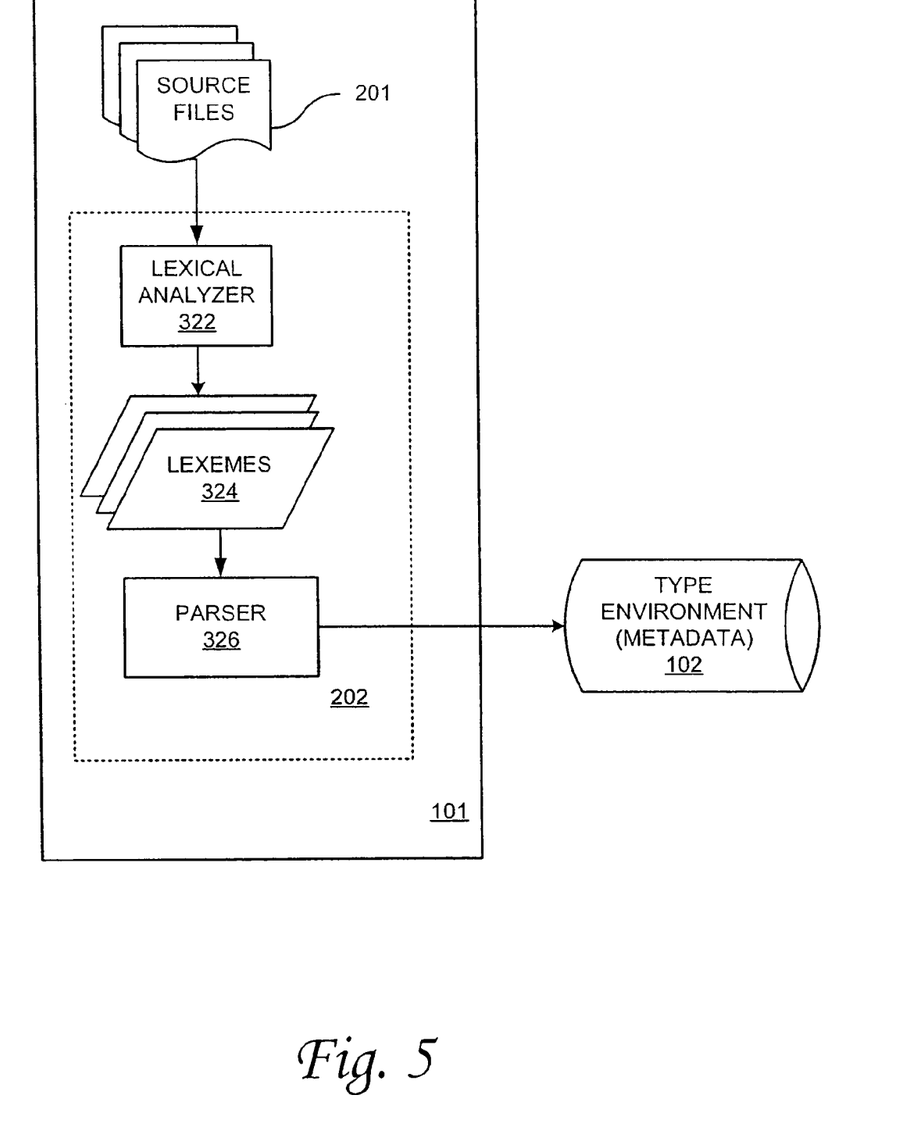
FIG. 5 is a diagram illustrating another exemplary implementation for a process for the conversion of source files for the population of environment information in accordance with one embodiment of the invention.

FIG. 5 is a diagram illustrating another exemplary implementation for a process 202 for the conversion of source files for the population of environment information 102 in accordance with one embodiment of the invention. Of primary distinction between the embodiment illustrated in FIG. 5 and that illustrated in FIG. 4, is that this embodiment does not perform the intermediate step of storing parsed results in a tree structure. Instead, in the example illustrated in FIG. 5, the type information is stored in type environment 102 as it is created. This embodiment may be useful, for example, when loading a JavaScript core library or other like file that can be directly typed and stored. This process can also be used to process specially formatted source code that is typically ignored in the source language (documentation comments, for example).

Referring now to FIG. 5, the process in this embodiment also begins with the analysis of source files 201. These source files can but need not be the same source files as those analyzed in other embodiments. In a step 322, the process searches for and recognizes the tokens and lexemes defined by the language of a source file 201. For example, a lexical analyzer or lexer can be used to create lexemes 324 of the source file 201 as discussed above with reference to FIG. 4. In this embodiment, however, in a step 326 a parser or other like technology can be used to process the lexemes 324 and to directly populate type environment 102.

Either embodiment can be used to capture type information that remains static throughout the lifetime of type environment 102. However, because the embodiment illustrated in FIG. 4, and its equivalents, creates an intermediate data structure (e.g., the abstract syntax tree), multiple instances of a symbol with different values can be stored for a given file or file collection. In other words, embodiments such as that illustrated in FIG. 4 allow for the capture of dynamic information.

It should be noted that in some instances snippets may be encountered for which it is impossible to determine a value. Therefore, in one embodiment a user is provided with an opportunity to identify the type for a given string. The parser can be implemented to parse comments, provide pop-ups to query users for information, or otherwise accept user input. This methodology can also be used to obtain user input allowing a user to confirm or correct a 'guess' that may have been made by the parser along the way.

Figure 6:
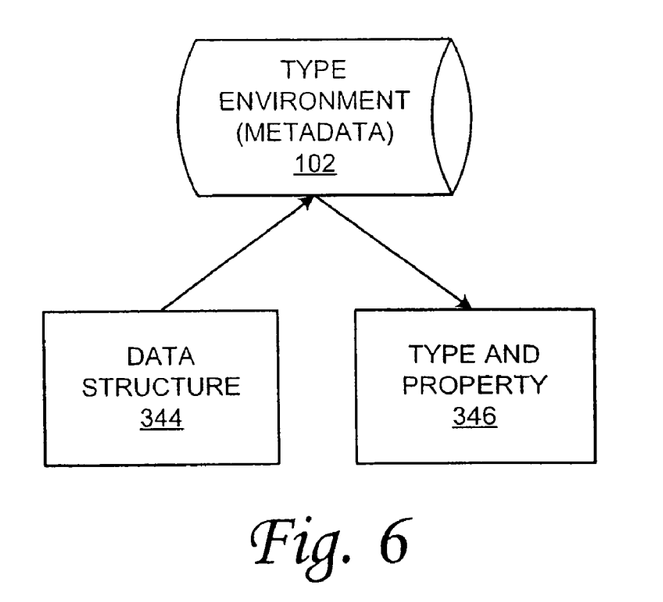
FIG. 6 is a diagram illustrating an exemplary process for querying a type environment in accordance with one embodiment of the invention.

As discussed above with reference to FIG. 2, once the type environment 102 is populated, a query process 103 queries the type environment 102. This query can be used to determine type and property information for the type environment 102. FIG. 6 is a diagram illustrating an exemplary process for querying type environment 102 in accordance with one embodiment of the invention. Referring now to FIG. 6, in the illustrated example, item 344 represents a data structure containing information that can be used to derive type, property or other information from the information populated in type environment 102. For example, in one embodiment item 344 is a key to query the hash table and includes all the information needed to derive type and property information from type environment 102. The key 344 can include three fields identifying the symbol, file index and offset. Further examples of this are discussed below with reference to FIGS. 8, 9, 10 and 11.

In one embodiment, all type lookups can begin with a symbol; however, it is possible that type information can be derived from data structures that are not attached directly to a symbol included in the information 102. In other words, it is possible to derive type and property information from intermediate values generated while the abstract syntax tree is being processed. Additionally, a symbol's type may change based on the position of that symbol within a source file 201. Larger collections of source files 201 can be viewed as one large source file 201 and the symbol's type may likewise have different values for different instantiations of that symbol in their respective positions within that collection of files. Because the values can change as the code is executed, the order of concatenation may be important in this scenario and there may be an implicit or explicit ordering to the source documents 201. Therefore, one embodiment captures both the index of the source file 201 (based on its order) and the offset within that source file 201 to supply enough information to determine the type for the given symbol at a given position.

Figure 7:
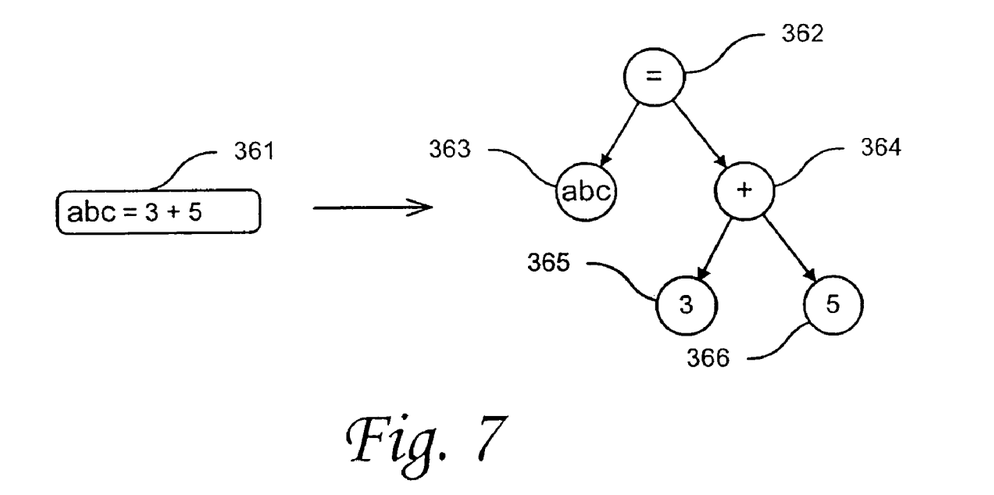
FIG. 7 illustrates an example snippet of JAVASCRIPT and its semantically equivalent representation as a tree structure in accordance with one embodiment of the invention.

FIG. 7 illustrates an example snippet of JAVASCRIPT and its semantically equivalent representation as a tree structure (e.g., an abstract syntax tree) in accordance with one embodiment of the invention. More specifically, this figure shows a simple symbol assignment snippet 361 that represents a symbol "abc" as the sum of two numbers, three and five in the illustrated example. In the equivalent abstract syntax tree format, the root node 362 identifies the type of operation represented by snippet 361. In this case, an assignment operation. For this operation to parse, two children are required, one for each side of the operation: nodes 363 and 364 in this case. Node 363 is the symbol "abc" to which to assign the value, and Node 364 is the value to assign to the symbol. As node 364 demonstrates, complex operations may be defined in abstract syntax trees. Item 364 shows the addition operation which signifies the addition of child nodes, nodes 365 and 366 in this case. Therefore, node 364 represents the addition of three (node 365) and five (node 366). As the example provided in FIG. 7 illustrates, a walk through the abstract syntax tree by a tree walker would indicate that symbol "abc" is to be added to the hash table, and to associate node 364 with the symbol, or the subtree identified by node 364. This operation in accordance with this example is illustrated below with reference to FIG. 8.

Figure 8:
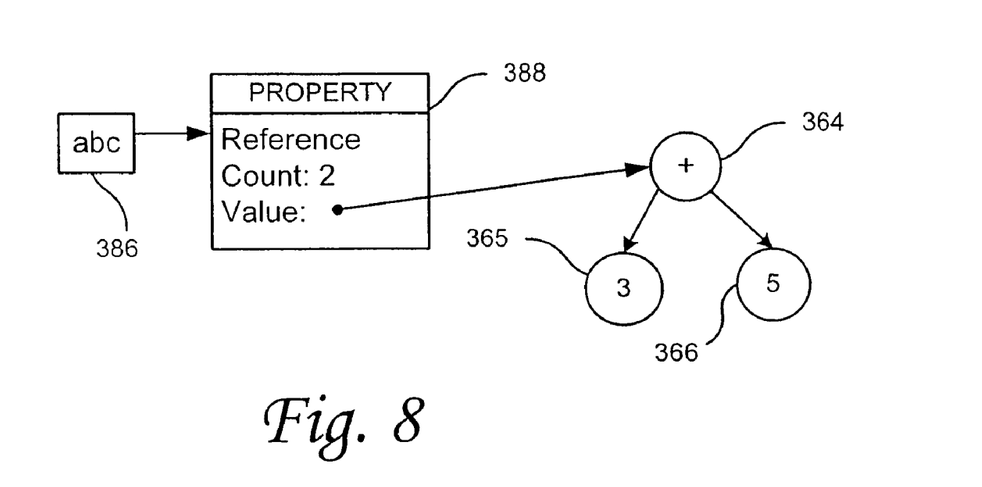
FIG. 8 is a diagram illustrating the entry of a code snippet into a type environment in accordance with one embodiment of the invention.

FIG. 8 is a diagram illustrating the entry of a code snippet into a type environment in accordance with one embodiment of the invention. Referring now to FIG. 8, a symbol (for example, symbol "abc" from snippet 361 in FIG. 7) is entered into type environment 102 as a property item 388. In one embodiment, the storage can be done in a hash table, for example, for fast lookup and the value of each hash entry can be a property 388 or other like entry. Some programs, including JAVASCRIPT use the concept of scope or namespaces to determine how symbols are looked up. Such scoping mechanisms may dictate how identifiers are used to retrieve values. As such, the system can be implemented to conform to the namespace or scoping requirements set forth for the source materials 201.

Property item 388 can store the symbols by name or other identifier. In another embodiment, the property item 388 does not store a name, but holds collections of type information (abstract syntax trees in the some of the examples outlined above) and other metadata for proper interpretation of the source language's semantics. For example, some properties may not be able to be removed from the environment. In such a scenario, the property can contain an attribute alerting the user to that fact and to prevent mechanisms such as reference counting from removing the entry.

In the illustrated example, key 386 is a simple string used to as a hash table index into type environment 102. In this example, key 386 points to property entry 388, which identifies the property characteristics of the "abc" node. In one embodiment, associations of symbols to values in type environment 102 are reversible and do not depend on the order in which entries are added or removed. This can be implemented to allow source code to be edited while keeping all type information up to date.

A property 388 can include a reference count, value and other metadata as may be specified by the source language. Reference counts can be used to keep track of the number of source code statements that reference or define this entry. In the example illustrated in FIG. 8, the value of the reference count is two. Reference counts can be used to facilitate determination of when a symbol 386 is no longer referenced, letting the programmer know when the symbol 386 can be removed from the type environment 102. Reference counts can be made independently of the order in which source code 201 is added and removed.

The property value can be included to identify the value of the string for which the key queried. In embodiments where references to another data structure such as an abstract syntax tree are used, the value can link back to the corresponding portion of the tree. In this example, the sub-tree starting at node 364 (from the example in FIG. 7) is inserted into or pointed to by the property 388 to as the value for that symbol at that point in the source. As further described below, storing abstract syntax tree sub-trees into the type environment 102 can be used to allow a programmer to delay type inferencing until the moment of the query.

As noted above, in one embodiment type environment 102 can be implemented as a hash table. Additionally, the data structure could be implemented as a simple array, a link list, or other data structure. This data structure preferably associates a key, which in this application can be a string value, with a value or simple data structure in the environment. The key or string can then be used to retrieve the associated value using only the original string value of the key.

Figure 9:
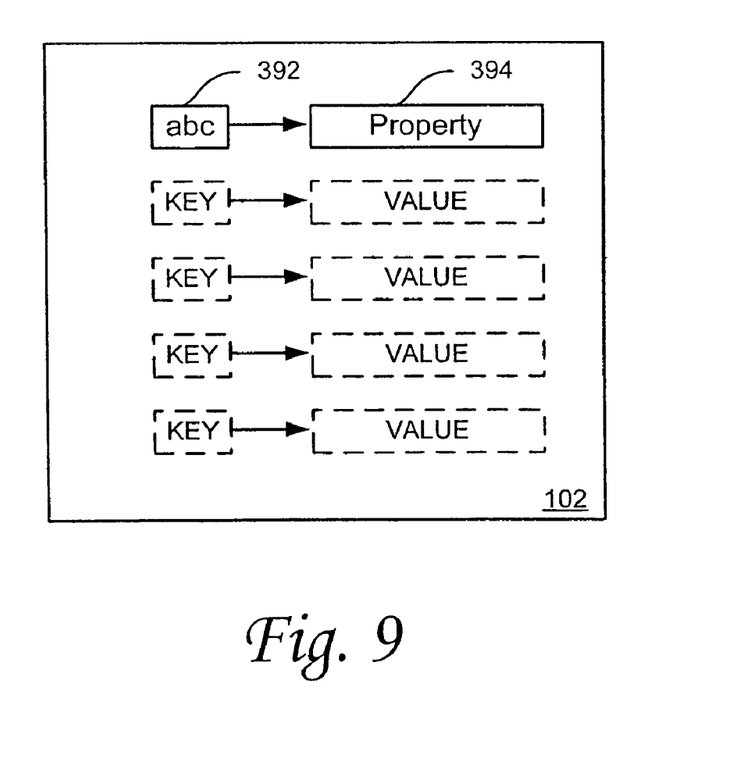
FIG. 9 is a diagram illustrating an example of one such data structure that can be used for the type environment in accordance with one embodiment of the invention.

FIG. 9 is a diagram illustrating an example of one such data structure that can be used for the type environment 102 in accordance with one embodiment of the invention. 392 represents a key that is used to look up a value in the runtime environment. In this case, key 392 is the string value of the symbol "abc" encountered during the parse of a source file 201 as illustrated in the examples described above with reference to FIG. 8. 394 represents the value associated with the key. In this case, 394 is a property data structure that holds information, for example a reference count and value array, used to determine the type associated with the symbol in 392. In terms of the example illustrated in FIG. 8, the value 394 is represented by property 388.

Figure 10:
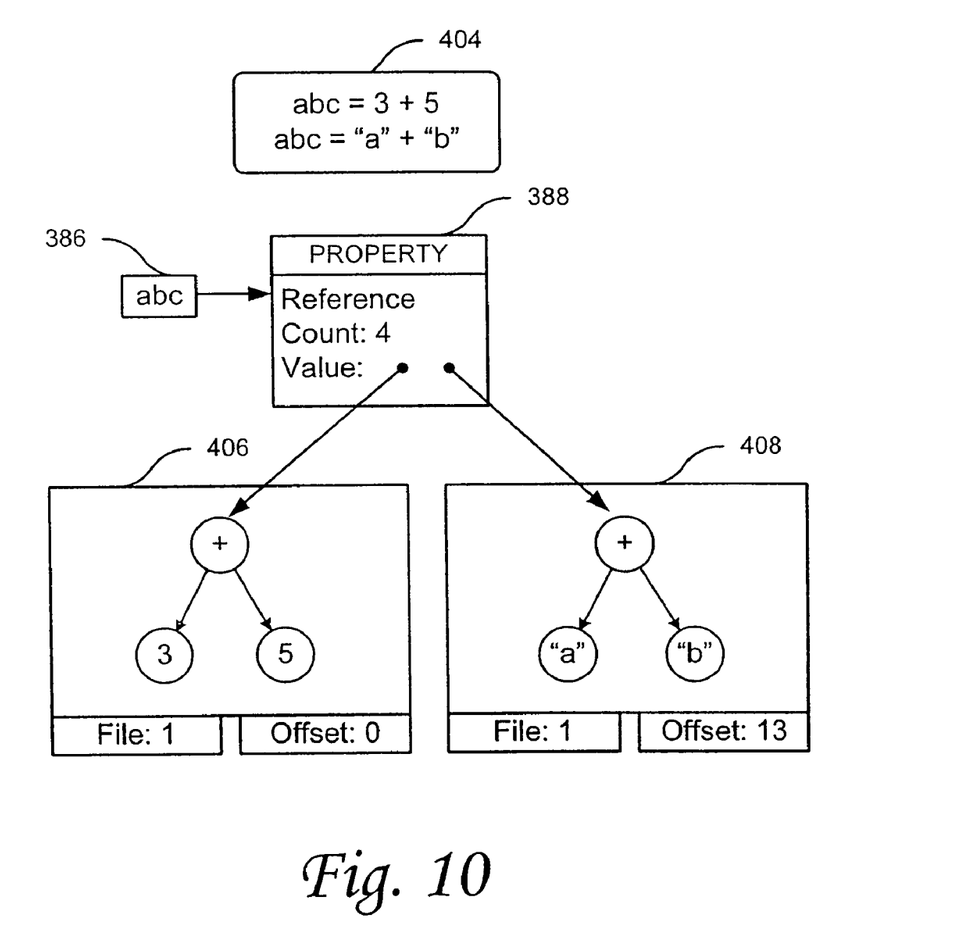
FIG. 10 is a diagram illustrating an example scenario that includes multiple definitions of a symbol in a runtime environment in accordance with one embodiment of the invention.

FIG. 10 is a diagram illustrating an example scenario that includes multiple definitions of a symbol in a runtime environment in accordance with one embodiment of the invention. In the illustrated example, a snippet 404 of JAVASCRIPT is used that contains two statements: abc=3+5; and abc="a"+"b". As illustrated, in this example, each statement assigns a value to the same symbol table entry, abc. However, these assignments occur at different offsets within the same file or in different files at different offsets within a merged set of files. Therefore, in one embodiment, the invention can be implemented to maintain a history of the types at various positions within the source file(s) 201.

The actual value of the property 388 is a collection of one or more data structures. In the illustrated example with a snippet having two statements, property 388 in type environment 102 is a collection of two data structures, data structure 406 and data structure 408. Each data structure contains the abstract syntax tree from the right-hand side of the assignment, along with the file index and offset identifying its location within that source file 201. The collection can be sorted by file index and offset for fast retrieval (binary search) of a given assignment in a file at a given position. In the illustrated example, data structure 406 represents the entry for the first line of code, and is shown as being in file 1 at an offset of zero. Likewise, data structure 408 represents the entry for the second line of code, again in file one at an offset of 13.

Figure 11:
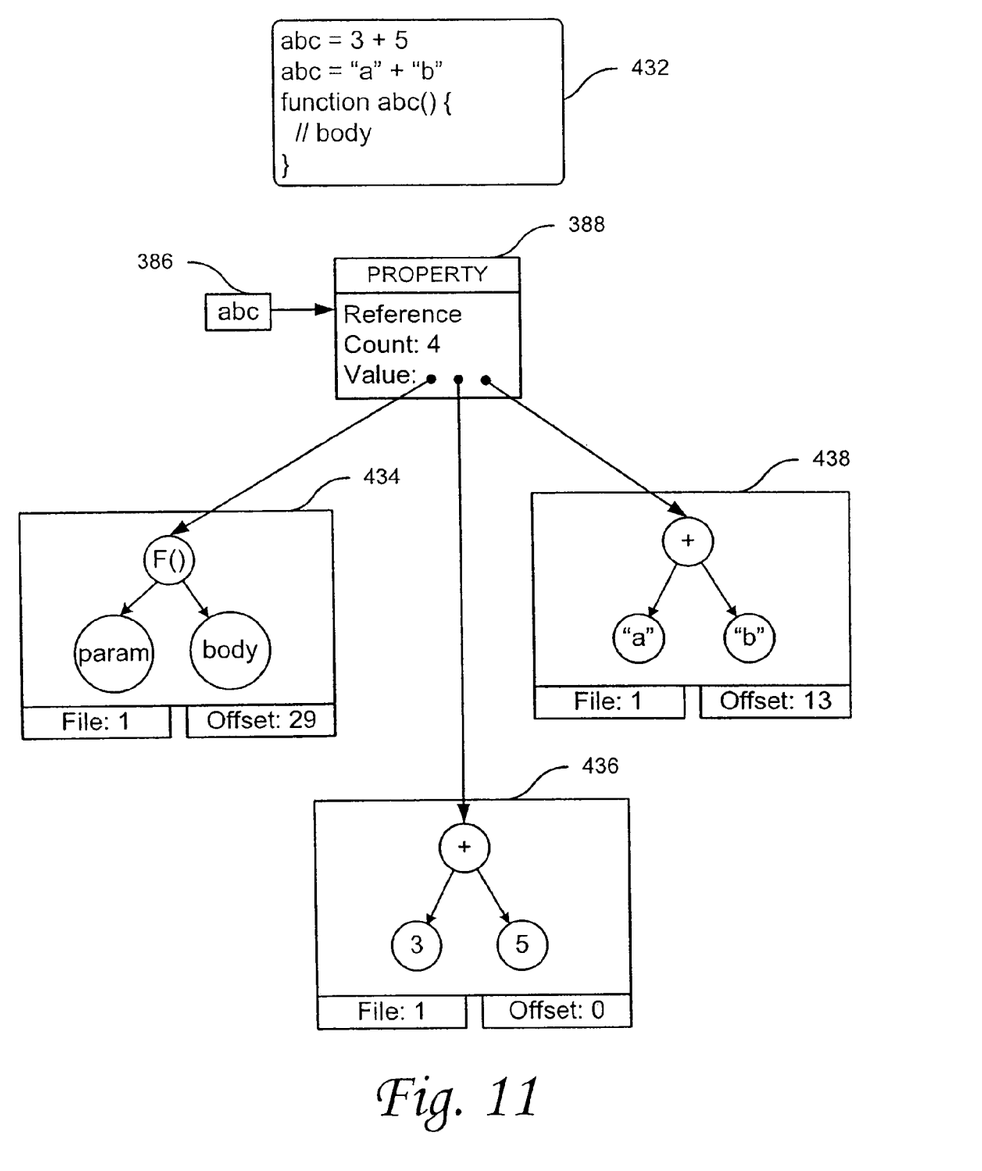
FIG. 11 illustrates examples of multiple definitions of a symbol in a type environment in accordance with one embodiment of the invention.

FIG. 11 illustrates examples of multiple definitions of a symbol in a type environment 102 in accordance with one embodiment of the invention. In the illustrated example, Item 432 is a snippet of JAVASCRIPT that contains three statements defining the "abc" symbol. Therefore, there are three data structures 434, 436 and 438 illustrated in this example. The first two statements are the same assignments as those discussed above with reference to FIG. 10, and have associated data structures 436 and 438. The third statement is a function definition for symbol 'abc' with data structure 434. Function definitions can also create symbols for type environment 102. However, in JavaScript and some other languages, functions are processed before any other content. Therefore, in one embodiment, the invention configures the sorting function to place all functions at the beginning of the list, regardless of the function definition's offset and file index. As this example illustrates, even though the assignment of a function to symbol "abc" occurs at offset 29, data structure 434 can be the first value referenced. Multiple function definitions can be sorted by file index and offset, but can always precede non-function definitions in this embodiment. Other languages may have different requirements, but many of these generally process code in a predictable order that the sorting mechanism can capture and follow. In other words, the processing or sorting orders set forth in the language can be followed for the invention. Additionally, a given order can be imposed through external mechanisms.

Figure 12:
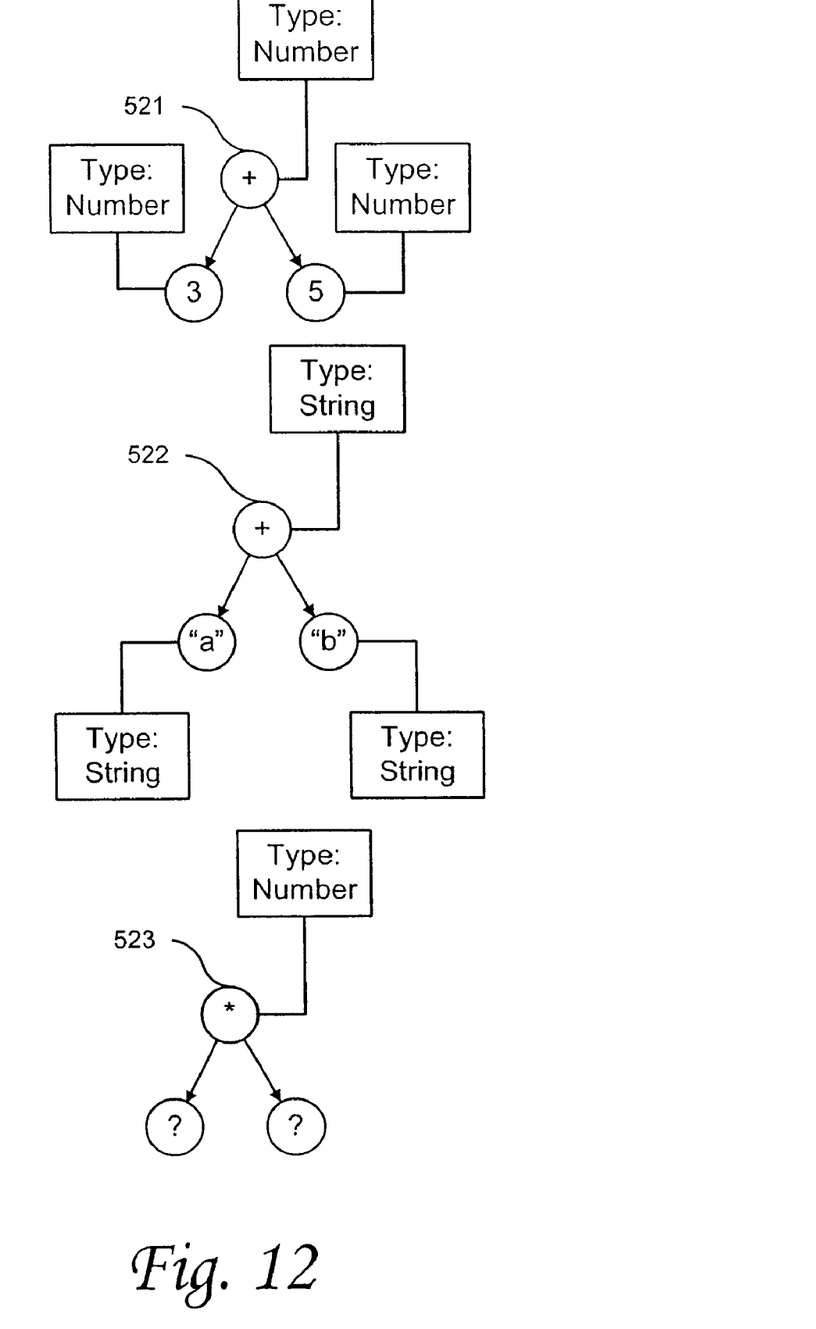
FIG. 12 is a diagram illustrating examples of types inferenced from abstract syntax trees in accordance with one embodiment of the invention.

FIG. 12 is a diagram illustrating examples of types inferenced from abstract syntax trees in accordance with one embodiment of the invention. This inferencing can occur after the entry in the symbol table has been located (for example, based on file index and offset). Node 521 is the addition operator. The children of node 521 are both Numbers, so the type of 521 is inferenced as a Number type in this example. However, the "+" lexeme can have multiple meanings in JAVASCRIPT and operators may likewise have multiple meanings in other languages. Indeed, node 522 shows an example wherein that the "+" lexeme is the string concatenation operator. The children of node 522 are both Strings, so the type of node 522 is inferenced as a String in this example. Where a data structure is used to store multiple parsed occurrences of the lexeme, its dynamic nature, that is, its various types within different portions of the code, can be inferred and maintained.

In some circumstances, however, not all operators need to know their child node types in order to derive their return type. One such example of this is illustrated by node 523. Node 523 is the multiplication operator and, with some languages, it can always be inferenced as a type Number regardless of its child node types. In other circumstances, however, a fuzzy inferencing approach may be implemented for certain nodes. For example, where a node is a function instantiation, that node may have different return types depending on how the function is invoked. In one embodiment, the system can be implemented to perform an intelligent guess as to the type based on past usage or other information. The system can also query the user or otherwise rely on user input to validate the choice or to accept instructions regarding correct typing for the function.

Dynamically-typed languages typically do not require the user to specify types upon creation of source files 201. As the above examples illustrate, an abstract tree node can have a defined type based on a number of factors. For example, the "+" node adopts a type based on its children and the multiplication operator is always a number type. If a language has rules such as this, or if an operator imposes such rules, then the parser can be implemented to follow these rules. There can also be specific rules regarding whether and how known primitive types convert to one another automatically, and how they merge during operations (such as, for example, the operation "x"+5). This information can be captured using a process similar to that described above with reference to FIG. 11, in a number of different languages. Because rules within a language may dictate if and how types automatically convert to one another, the parser can be implemented so as to follow constructs outlined by those rules or based on user instruction.

Figure 13:
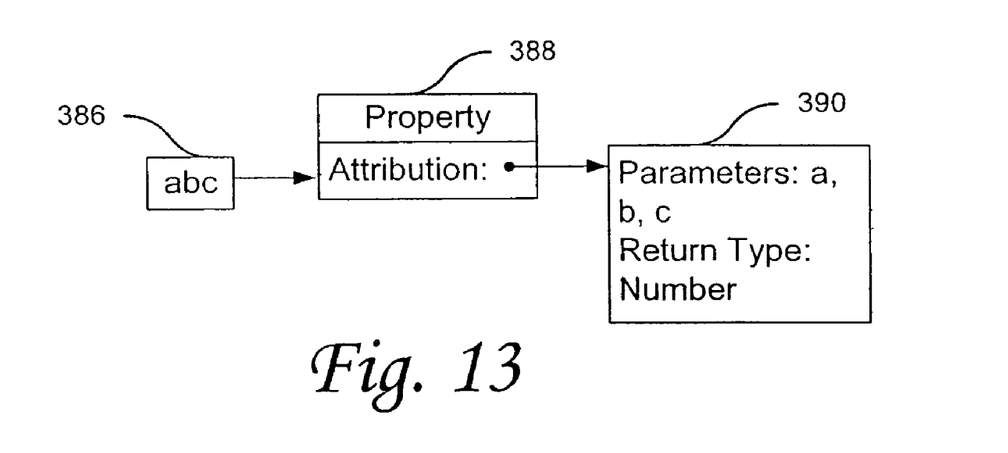
FIG. 13 is a diagram illustrating an example of how properties and values may be augmented by alternate sources in accordance with one embodiment of the invention.

FIG. 13 is a diagram illustrating an example of how properties and values may be augmented by alternate sources in accordance with one embodiment of the invention. Item 390 lists the parameters and return type of the "abc" symbol in type environment 102. There are cases where it may not be possible to infer a type in typeless languages. This can occur, for example, when data is supplied by an outside source, like a web service. Also, there may be cases where a function's return type cannot be inferred unless it is actually referenced in code. Typically, script libraries do not call all of their functions, potentially making it difficult or impossible to determine the return type of those functions. In those cases, alternate mechanisms can be used to provide this information, such as, for example, comment documentation, user intervention through the UI, or even probability algorithms (best guess). As these examples illustrate, other mechanisms may be invoked to provide this information as well. Item 390, for example, tells us that the symbol "abc" is a function, with three parameters (a, b, and c), and that it returns a Number. Note that where particular lexemes or other information provide a situation where it is difficult for the engine to infer a type, such items may be hard for the user to understand as well. As such, in one embodiment, the system may encourage clearly written and commented code or otherwise influence the way code is crafted.

The invention can be implemented in one embodiment such that the type information can be extracted or inferred without the need to execute the code to determine the type information. For example, as illustrated in FIGS. 4 and 5, in these examples the source files 201 can be analyzed and parsed, and the type information can be extracted or inferred, without executing the code. Beneficially, therefore, type information can be extracted even where the developer does not have access to an executable interpreter in the runtime, or where errors, incomplete coding or other scenarios may otherwise prevent execution to determine types.

Additionally, as the example in FIGS. 4, 10 and 11 illustrate, multiple values for a variable within a source file 201 (or even within multiple source files 201) can be determined and stored. In one embodiment, where a variable may have multiple values at various points in the execution of a program, the determined values are stored in a hash table that can include information pertaining to the value of the variable at a given location within the source. Because the type information can be determined without requiring execution, type information can be identified for various points in time and variable changes from one portion of the source to another can be tracked and identified.

Objects in the Runtime Environment

Below is a list of example types that can be captured in the JavaScript runtime environment.

1) Array
2) Boolean
3) Date
4) Error
5) Function
6) Null
7) Number
8) Object
9) RegExp
10) String
11) Undefined
12) User-defined
13) Commands (aka AST nodes)

Items 1 through 11 can be provided by user agents that follow the ECMAScript specification. User-defined types (item 12) are created by the developer in their source files. AST nodes (item 13) are used to delay type inferencing until the information is requested.

Language Constructs

Below is a list of example JavaScript constructs that can be supported by this invention. As these examples illustrate, other constructs in JAVASCRIPT and other languages may be supported as well. These constructs can be parsed and represented by Abstract Syntax Tree nodes. The Abstract Syntax Tree nodes can in turn be used to associate symbols with individual sub-trees in the Abstract Syntax Tree, which in turn can be used to infer type information as it is requested. Assignment: simple assignment, add and assign, arithmetic shift right and assign, bitwise- and assign, bitwise- or and assign, bitwise-exclusive- or and assign, divide and assign, modulus and assign, shift left and assign, shift right and assign, subtract and assign. Unary operators: bitwise- not, negation, post-decrement, post-increment, pre-decrement, pre-increment, type of, with. Binary operators: addition, get index, get name Logical binary operators: equality, greater than, greater than or equal, identity, in, instance of, less than, less than or equal, logical and, logical or, not equal, not identity Numerical binary operators: arithmetic shift right, bitwise- and, bitwise- or, bitwise-exclusive- or, division, modulus, multiplication, shift left, shift right, subtract Trinary operators: conditional Flow control: break, case, continue, do, for, for in, if, switch, while, function invocation, return. Instantiation: new Exception handling: try, catch, finally, throw.

While various embodiments of the present invention have been described above, it should be understood that they have been presented by way of example only, and not of limitation. Thus the breadth and scope of the present invention should not be limited by any of the above-described exemplary embodiments. Additionally, the invention is described above in terms of various exemplary embodiments and implementations. It should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," and terms of similar meaning should not be construed as limiting the item described to a given time period or to an item available as of a given time, but instead should be read to encompass conventional, traditional, normal, or standard technologies that may be available now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

While various embodiments of the invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for extracting type information from a dynamically-typed programming language, the method comprising:
    generating a plurality of nodes, the nodes generated by a parser, wherein each of the plurality of nodes comprise an abstract syntax tree node associated with a symbol in a runtime environment, wherein a symbol has a different type information at a different position in a source code;
    requesting type information from the dynamically-typed programming language based on a particular symbol and a position, the type information requested by an integrated development environment;
    locating the particular symbol at the position in the runtime environment; and
    returning a value associated with the particular symbol at the position to be read by a processor, the particular symbol at the position used to retrieve information about an underlying object being queried.

2. The method of claim 1, wherein the requesting step is performed during editing of code.

3. The method of claim 1, wherein the returning step includes evaluating the value based on a current state of an environment and returning a type at that moment in time for a given file and file offset.

4. The method of claim 1, further including storing information for each occurrence of a symbol and inferring a type for each occurrence of the symbol.

5. A method for populating a type environment when loading a JAVASCRIPT core library, the method comprising:
    identifying lexemes in a source code in the dynamically-type programming language;
    organizing the lexemes into a stream of lexemes;
    detecting patterns in the stream of lexemes;
    generating a plurality of abstract syntax trees representing the detected patterns, the plurality of abstract syntax trees generated by a parser;
    associating a symbol with each of the plurality of abstract syntax trees using a tree walker to evaluate each of the plurality of abstract syntax trees, wherein a symbol has a different the type information at a different position in a source code;

populating a type environment with the type information;

storing the type information as metadata within the type environment as the type environment is created; and performing one or more queries on the type information by requesting type information based on a particular symbol and a position, the type information requested by an integrated development environment, locating the particular symbol at the position in the runtime environment, and returning a value associated with the particular symbol at the position to be read by a processor, the particular symbol at the position used to retrieve information about an underlying object being queried.

6. The method of claim 5, further comprising using a hash table to implement the type environment, wherein the hash table comprises information pertaining to a reference count that indicates the number of times a variable is referenced and information pertaining to the one or more values that a referenced variable may take at a given point in the source code.

7. A computer program product comprising a non-transitory computer useable medium having computer program logic recorded thereon for populating a type environment from a dynamically-typed programming language, the computer program product comprising:

a computer program code logic configured to process source files obtained from one or more sources into type information, the computer program code logic configured to identify lexemes in the inputs, organize the lexemes into a stream of lexemes, detect patterns in the stream of lexemes, generate a plurality of abstract syntax trees representing the detected patterns, the plurality of abstract syntax trees generated by a parser, and associate a symbol with each of the plurality of abstract syntax trees using a tree walker to evaluate each of the plurality of abstract syntax trees wherein a symbol has a different type information at a different position in a source code;

a computer program code logic configured to populate a type environment with the type information;

a computer program code logic configured to store the type information as metadata as the type environment is created; and a computer program code logic configured to perform one or more queries on the type information by requesting the type information based on a particular symbol and a position, the type information requested by an integrated development environment, locating the particular symbol at the position in the runtime environment, and returning a value associated with the particular symbol at the position to be read by a processor, the particular symbol at the position used to retrieve information about an underlying object being queried.

8. The computer program product of claim 7, further comprising computer program code logic configured to use a hash table to implement the type environment, wherein the hash table comprises information pertaining to a reference count that indicates the number of times a variable is referenced and information pertaining to the one or more values that a referenced variable may take at a given point in the source code.

* * * * *